Patented Dec. 19, 1944

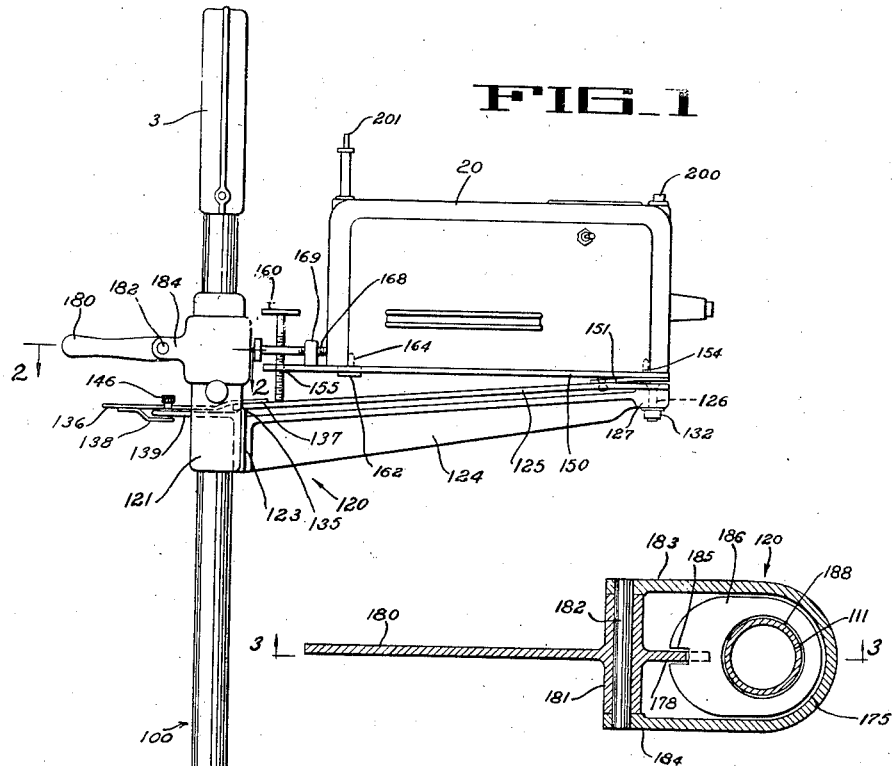
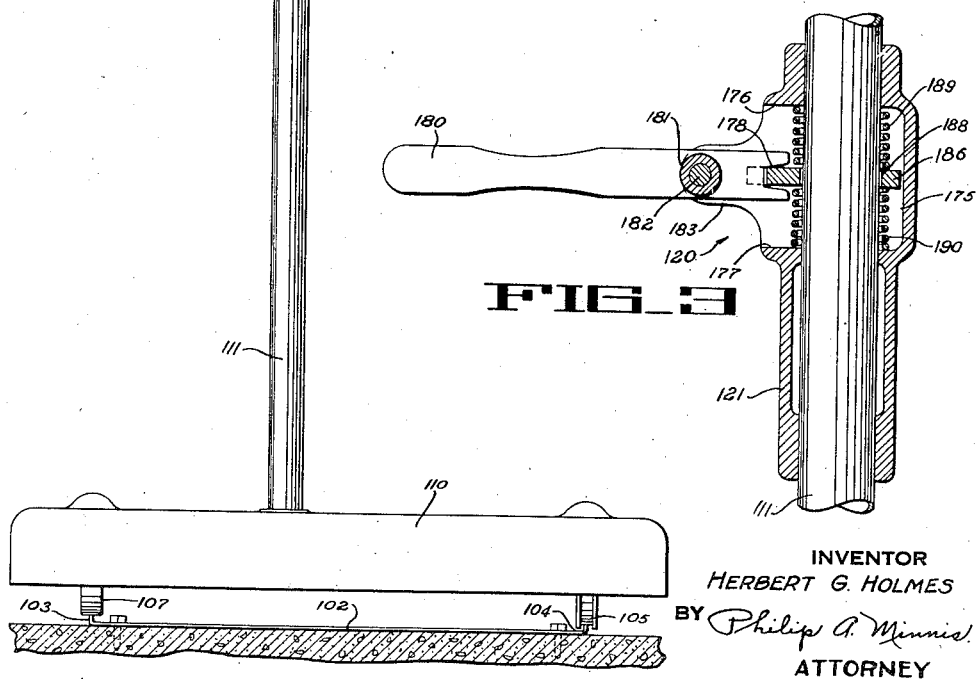

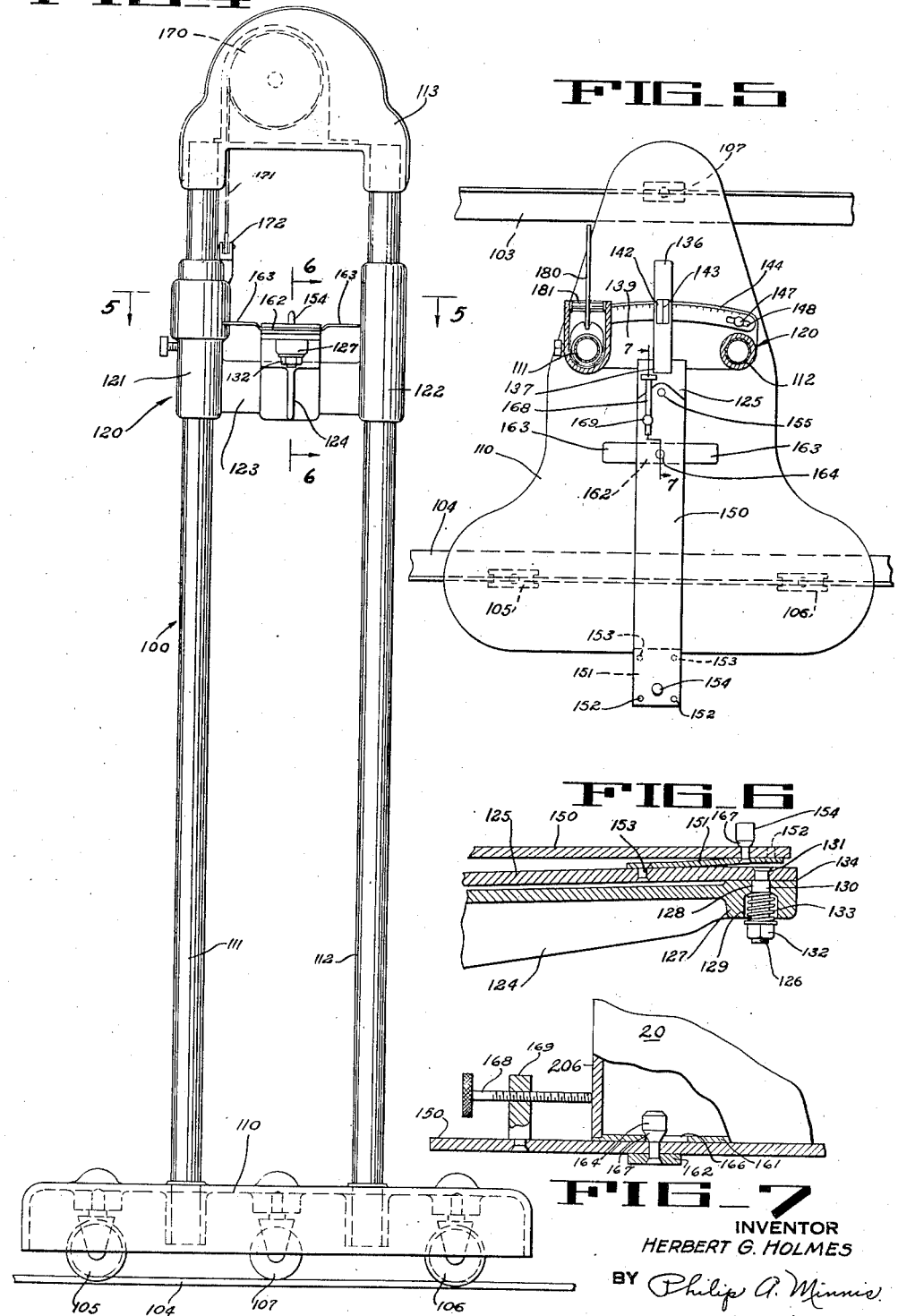

2,365,410

UNITED STATES PATENT OFFICE 2,365,410

HEADLIGHT TESTING APPARATUS

Herbert G. Holmes, Lansing, Mich., assignor to Food Machinery Corporation, San Jose, Calif., a corporation of Delaware Original application March 3, 1941, Serial No. 381,455. Divided and this application July 15, 1942, Serial No. 450,999

19 Claims. (Cl. 248—125)

Ths invention relates to headlight testing apparatus and more particularly to a stand and mounting for headlight testing devices.

The present application is a division of my copending application, Serial No. 381,455, filed March 3, 1941.

An object is to provide a supporting stand for headlight testing instruments or other devices which is of improved construction.

Another object of this invention is to provide an improved portable stand having a readily adjustable support for holding and aiming a headlight testing instrument or device.

A further object is to provide an instrument supporting stand providing a fine and readily accessible adjustment for the instrument support.

An additional object is to provide a stand for supporting and aiming a headlight testing instrument or device and that indicates the angular position thereof with regard to the car when determining the horizontal aim of the headlight beam.

Still another object is to provide an improved stand construction for detachably mounting and locking the headlight testing instrument or device to the support.

These and other objects of the invention will be more readily understood from the following description and the claims taken in conjunction with the accompanying drawings in which Fig. 1 is a side elevation of the stand of my invention with a headlight testing instrument in position on the support thereof;

Fig. 2 is a fragmentary section taken as indicated by the arrows 2—2 in Fig. 1;

Fig. 3 is a vertical section taken as indicated by the arrows 3—3 in Fig. 2;

Fig. 4 is a front elevation of the stand with the headlight testing instrument removed therefrom;

Fig. 5 is a horizontal section taken as indicated by the arrows 5—5 in Fig. 4;

Fig. 6 is a fragmentary vertical section taken as indicated by the arrows 6—6 in Fig. 4; and Fig. 7 is an enlarged sectional detail taken at 7—7 of Fig. 5 with the headlight testing instrument in place showing the manner of securing the same.

Referring to the drawing wherein similar numerals indicate the same parts of the structure, 20 (Fig. 1) is a headlight testing device or instrument, for instance that disclosed in my copending application aforesaid, mounted on a stand generally designated by the numeral 100. The stand is adapted to run on a track 102 (Fig. 1) which has parallel rails 103, 104. Flanged rollers 105, 106 (Fig. 4) engage the rail 104 and a roller 107 (Figs. 1 and 4) engages the rail 103. The three rollers 105, 106, 107 are suitably mounted in the base 110 of the stand. Two parallel columns 111 and 112 (Fig. 4) are rigidly secured at their lower ends in the base 110 and rise vertically therefrom. The upper ends of the columns are interconnected by means of a yoke casting 113.

A support indicated generally at 120 (Figs. 1 and 4) is vertically adjustable on a mount, for instance the columns 111 and 112. The support 120 has two bearing portions 121, 122 which provide sliding bearings for the support 120 on the columns 111, 112. The bearing portions 121, 122 are interconnected by a transverse web 123 cast integrally therewith. Extending forwardly from the web 123 and cast integrally therewith is an arm 124.

A horizontal aim bar 125 (Fig. 1) for aiming the instrument 20, is mounted on the arm 124 for swinging movement in a horizontal plane by means of a vertical pivot 126. As shown in detail in Fig. 6, a boss 127 is formed in the front end of the arm 124. This boss has a vertical bore 128 and a counterbore 129. The pivot pin 130 fits in the bore 128 and is riveted to the horizontal aim bar 125 at 131. The lower end of the pivot pin 130 is threaded to receive a nut 132. A compression spring 133 is interposed between the nut and the shoulder of the counterbore 129. The pivot pin 130 which is rigidly attached to the bar 125 is free to rotate in the bore 128 and the spring 133 holds the under side of the bar 125 against the upper face 134 of the boss 127.

The rear end of the horizontal aim bar 125 (Fig. 1) rests upon an upstanding rib 135, formed on the web 123 of the support 120, and is free to slide back and forth thereon as the bar turns about its pivot 126. A handle 136 for swinging the bar 125 is rigidly attached thereto at 137. To the underside of the handle 136 is fastened as by welding an offset forwardly directed finger 138 which, with the handle 136, straddles a ledge 139 formed integrally with the support 120 and projecting rearwardly from the web 123 (Fig. 1). The finger 138 substantially engages the ledge 139 for preventing lifting or distortion of the bar 125 and also serves to guide the same when making an adjustment. As shown in Fig. 5, the handle 136 has a window 142 therein provided with a cross hair 143 for indicating the position of the horizontal aim bar 125 relative to an arcuate scale 144. The ledge 139 of the support 120 supports the scale 144. For a purpose hereinafter explained, the scale 144 is made adjustable. It is attached to the ledge 139 by screws 146 (Fig. 1) and 147 (Fig. 5) provided with knurled clamping nuts. The screws pass through short arcuate slots, such as 148, formed in each end of the scale. When the nuts are loosened the scale can be adjusted by shifting it laterally and the adjustment can then be maintained by tightening the nuts.

An instrument supporting bar 150 (Fig. 1) is attached to the forward end of the horizontal aim bar 125 by means of a resilient member, for instance a spring steel strap 151 which acts as a hinge, without any wear or lost motion. As shown in Figs. 5 and 6, the strap 151 is secured to the bar 150 by rivets 152 and to the bar 125 by rivets 153. Riveted to the bar 150 and strap 151 is a dowel pin 154. The rear end of the supporting bar 150 (Fig. 5) has a threaded aperture 155 which receives an adjusting set screw 160 (Fig. 1) which bears against the horizontal aim bar 125. Turning of the adjusting screw 160 causes the supporting bar 150 to rock on its hinge 151.

The headlight testing instrument 20 is adapted to be detachably mounted on the supporting bar 150 in a predetermined position. A supporting bracket 162 (Fig. 1) is rigidly secured to the under side of the bar 150. This bracket has laterally extending wings 163 (Figs. 4 and 5). The instrument is supported by the bar 150 and the wings 163. It is fixed in a predetermined position thereon by means of dowel pins. The front dowel pin 154 (Fig. 6) has already been referred to. The rear dowel pin 164 (Figs. 1 and 5) is rigidly secured as by riveting in the bar 150 and bracket 162, as shown in Fig. 7. Fig. 7 also illustrates the manner of mounting the instrument 20 to the bar 150. Thus, the bottom 161 of the instrument case has two elongated apertures 166, only one of which is shown in Fig. 7, into which the dowel pins fit. After the instrument has been positioned on the bar 150 (Figs. 1 and 7) with the dowel pins 154, 164 in the large portion of the apertures 166, (Fig. 7), the instrument is secured in place by a set screw 168 (Figs. 1 and 7) threaded through a post 169 which is rigidly mounted as by riveting to the bar 150. When the set screw 168 is tightened the instrument 20 is shifted forwardly on the bar 150 to engage the rear edges of the narrow portions of the apertures 166 (Fig. 7) under the shoulders 167 on the dowel pins 154 and 164.

Means are provided to facilitate adjusting the instrument and its support vertically on the columns 111, 112 of the stand. To counterbalance the weight of the instrument and the support 120 (Fig. 4) a spring wound reel 170 is rotatably mounted in the yoke 113 at the top of the stand. A tape 171 attached to the reel and wound thereon is connected at 172 to the support 120. This enables the support 120 to be readily and easily slid up and down on the columns 111, 112.

In order to permit the operator to obtain fine adjustments the device shown in detail in Figs. 2 and 3 is provided. Formed integrally with the bearing portion 121 of the support 120 is an enclosure 175 having an upper wall 176 and a lower wall 177. This enclosure is open at the rear to permit the entrance of a jaw 178 formed on a lever 180. The lever 180 has a hub 181 bored to receive a pin 182 which is supported in ears 183, 184 formed integrally with the support 120.

The jaw 178 of the lever 180 enters a notch 185 (Fig. 2) formed in a plate 186 and is adapted to engage the plate on its top or bottom depending on whether the lever 180 is turned clockwise or counter clockwise, respectively, on its pivot 182 (Fig. 3). The plate 186 has a hole 188 therein which is larger in diameter than the column 111 which the plate encompasses. A compression spring 189 is interposed between the plate 186 and the upper wall 176 of the enclosure 175, and another compression spring 190 is interposed between the plate and the lower wall 177.

The operation of the fine adjustment device is as follows: Normally the parts occupy the positions shown in Fig. 3 where the two springs 189, 190 maintain the plate 186 horizontal. When the lever 180 is depressed the jaw 178 is tilted and cramped against the column and continued depression of the lever 180 causes the support to be moved downwardly, the jaw using the plate as a fulcrum. If the support cannot be lowered as far as desired with one movement of the lever its is released, whereupon the springs restore the parts to normal. The lever can then be depressd again and the plate will take a fresh grip on the column and the support can be lowered further. Conversely, the support can be raised by lifting the lever 180, in which case the plate is tilted the other way. The device is thus reversible in operation and permits very delicate adjustments of the support vertically on the columns.

It is to be observed that in operation of the fine adjustment device on a stand of the character illustrated in the drawings, the spring counterbalance 170 holds the instrument in any vertical position that it is placed so that the springs 189 and 190 may restore the lever 180 and plate 186 to their normal position when the instrument is moved up and down.

The operation of utilizing the stand of my invention for testing the headlights of an automobile will now be described. An automobile is driven up to the track 102 so that the center line of the automobile is approximately at right angles to the track, and so that there is sufficient clearance between the headlight tester and the front end of the automobile to permit the tester stand to be rolled along the track in front of the automobile. The line of travel of the vehicle and the relation of that line to the track 102 is then determined by the means set forth in my copending application aforesaid.

The instrument stand is then moved and the instrument is adjusted to bring the sights 200, 201 of the instrument 20 into line with the line of travel of the automobile. Usually, because of the fact that the automobile does not travel in a line exactly at right angles to the track, it is necessary to swing the horizontal aim bar 125 (Fig. 5) by means of the handle 136 in order to bring the instrument sights into line. After alignment of the sigths the horizontal aim scale 144 is adjusted by loosening the nuts on the screws 146, 147 to bring the zero mark of the scale under the cross hair 143. Then the nuts are tightened to hold the scale in adjusted position. In this manner the angular relationship between the line of travel of the automobile and the track is established and maintained throughout the test.

The stand is then rolled along the track to position the instrument in front of the left-hand headlight. The instrument is adjusted to bring its longitudinal axis into line with the headlight beam. To so position the instrument the following instruments are available: Horizontal translation by rolling the stand on the track. Vertical translation by moving the support 120 (Fig. 1) on the columns 111, 112, fine adjustments being obtained by operating the lever 180. Tilting in a vertical plane is effected by turning the screw 160. Swinging in a horizontal plane is obtained by operating the handle 136 to turn the bar 125 about its pivot 126.

When the instrument has been positioned in line with the beam the horizontal aim is indicated by the cross hair 143 on the scale 144. The vertical aim is determined as described in my copending application aforesaid. After the left-hand headlight has been tested the stand is rolled along the track to position the instrument in front of the right-hand headlight and the procedure for testing the beam is repeated.

While the particular apparatus herein described is well adapted for carrying out the objects of the present invention it will be understood that various modifications, changes, and substitutions may be made without departing from the spirit of the present invention and the present invention is to be construed to include all such modifications, changes and substitutions as may come within the scope of the following claims.

What I claim as new and desire to protect by Letters Patent is:

1. A stand comprising a mount, a support movable relative to said mount, and means for adjusting the support with respect to said mount including a member to engage said mount, and an actuator on the support for cramping said member against the mount and for moving the support relative thereto.

2. A stand comprising a mount, a support slidable on said mount, and means for moving the support relative to said mount including a member to engage said mount, and lever means associated with the member and support for cramping said member against said mount and for moving said support relative thereto.

3. A stand comprising a column, a support slidable on said column, a floating member for engaging said column, and means for cramping said member against said column and for shifting the support relative thereto.

4. A stand comprising a column, a support slidable on said column, a lever for moving said support on said column, and means engageable with said column providing a fulcrum for said lever.

5. A stand comprising a vertically disposed column, a vertically adjustable support slidable on said column, a counterbalance for holding said support in any vertical position, a member on said column normally out of engagement therewith, and a lever pivoted in said support for cramping said member against said column and for shifting the support relative thereto.

6. A stand comprising a vertically disposed column, a vertically adjustable support slidable on said column, a member encompassing said column having an aperture therein of greater diameter than said column, said member being freely movable along said column as long as the axis of said aperture is substantially coincident with the axis of said column, and a lever pivoted in said support for tilting said member to bring it into frictional engagement with said column and for shifting the support relative thereto.

7. A headlight testing instrument stand comprising a vertically disposed column, a vertically adjustable support slidable on said column, and means to move said support vertically including an apertured plate encompassing said column, means in said support for normally maintaining said plate in position for free movement along said column, including a counterbalance for said support, and a lever in said support operable first to tilt said plate to frictionally engage said plate with said column and then to move said support relative to said plate.

8. A headlight testing instrument stand comprising a vertically disposed column, a vertically adjustable support on said column, means for moving said support vertically on said column and mounting means associated with said support for detachably mounting the testing instrument including a member having dowel pins for engaging apertures in the instrument and releasable holding means for retaining the dowels in said apertures.

9. A headlight testing instrument stand comprising a column, an adjustable support on said column and an instrument carrying member pivotally mounted on said support and provided with projecting elements having instrument engaging lips thereon and screw means for locking the instrument relative to said elements when engaged with said lips.

10. A headlight testing instrument stand comprising a vertically disposed column, a vertically adjustable support on said column, means for adjusting said support vertically on said column, and instrument mounting means associated with said support including a member having a vertical pivot on said support, a second member having a spring connection at one end with the first member and an adjustable connection therewith at the other, and means for securing the instrument to the second member.

11. A headlight testing instrument stand comprising a mount, a support on said mount, means for adjusting said support on said mount and means associated with said support for holding the instrument including a member having one end pivotally connected with said support for horizontal movement, a second member for receiving the instrument, having one end connected with said first member adjacent said pivot, and provided with adjustable means at the other end for vertically spacing the two said members at said end, and cooperating means on said support and on said first member at the end remote from said pivot for indicating the extent of movement of said members about said pivot.

12. A headlight testing instrument stand comprising a vertically disposed column, a vertically adjustable support on said column and adjustable instrument positioning means on said support including a member having an end pivotally mounted at the front end of said support, a scale cooperating with the opposite end of said member and means for adjusting said scale to vary the zero thereof.

13. A headlight testing instrument stand comprising a mount, an adjustable support on said mount and adjustable instrument positioning and carrying means on said support including a member having means for resiliently mounting the instrument and vertical pivot means securing said member to the front end of said support.

14. A headlight testing instrument stand having a vertically adjustable support, means for adjusting said support vertically, a horizontal aim bar pivotally mounted on said support, an instrument mounting member and means for supporting said member on said bar including a spring steel strap and an adjusting screw.

15. A headlight testing instrument stand comprising a vertically disposed column, an adjustable support, means for adjusting said support vertically on said column, and instrument carrying and positioning means on said support including a positioning member having a vertical pivot in said support, a carrying member having spring connection with said positioning member and concurrently movable therewith, means on said positioning member and substantially engaging said support for swingably moving said positioning member and carrying member relative to said support and a scale fixed to said support and cooperating with said positioning member for indicating the angular position thereof.

16. A headlight testing instrument stand comprising a vertically disposed column, a vertically adjustable support on said column having a bearing portion movable on said column and an arm portion extending laterally from said bearing portion, means projecting from said bearing portion for adjusting said support vertically on said column and movable instrument mounting means associated with said lateral arm including a member having one end pivotally secured to said arm for horizontal movement, a second member resiliently connected to said first mentioned member having means for securing the instrument thereto and an adjustment arm on said first mentioned member for concurrently swinging the members relative to said lateral arm.

17. A stand comprising a vertically disposed column, a vertically adjustable support slidable on said column, a member encompassing said column having an aperture of greater diameter than said column, resilient means normally maintaining said member with the axis of its aperture substantially coincident with the axis of the column, and a lever pivotally mounted on said support for tilting said member into frictional engagement with said column and for shifting the support relative thereto.

18. A stand comprising a vertically disposed column, a vertically adjustable support slidable on said column, a member encompassing said column having an aperture of greater diameter than said column, resilient means intermediate said support and member normally maintaining said member with the axis of its aperture substantially coincident with the axis of the column, and a lever pivotally mounted on said support for tilting said member into frictional engagement with said column and for shifting the support relative thereto.

19. A stand comprising a column, a support slidable on said column, a member encompassing said column having an aperture of greater diameter than said column, resilient means normally maintaining said member with the axis of its aperture substantially coincident with the axis of the column, and a lever pivotally mounted on said support and engaging said member for tilting the same in one or the opposite direction into frictional engagement with said column and for shifting the support in one or the opposite direction on said column depending upon the direction of tilt of said member.

HERBERT G. HOLMES.

CERTIFICATE OF CORRECTION.

Patent No. 2,365,410.　　　　　　　　　　　　　　December 19, 1944.

HERBERT G. HOLMES.

It is hereby certified that error appears in the printed specification of the above numbered patent requiring correction as follows: Page 2, second column, line 26, for "its" read --it--; line 65, for "sigths" read --sights--; page 3, first column, line 4, for "instruments" read --adjustments--; and that the said Letters Patent should be read with this correction therein that the same may conform to the record of the case in the Patent Office.

Signed and sealed this 12th day of June, A. D. 1945.

Leslie Frazer

Acting Commissioner of Patents.

(Seal)